United States Patent
Jo et al.

(10) Patent No.: US 10,951,072 B2
(45) Date of Patent: Mar. 16, 2021

(54) WIRELESS POWER DEVICE HAVING PLURALITY OF TRANSMISSION COILS AND DRIVING METHOD THEREFOR

(71) Applicant: LG INNOTEK CO., LTD., Seoul (KR)

(72) Inventors: Min Young Jo, Seoul (KR); Jong Heon Lee, Seoul (KR); Yong Suk Chae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 244 days.

(21) Appl. No.: 16/077,184

(22) PCT Filed: Feb. 2, 2017

(86) PCT No.: PCT/KR2017/001109
§ 371 (c)(1),
(2) Date: Aug. 10, 2018

(87) PCT Pub. No.: WO2017/138713
PCT Pub. Date: Aug. 17, 2017

(65) Prior Publication Data
US 2019/0356175 A1 Nov. 21, 2019

(30) Foreign Application Priority Data
Feb. 12, 2016 (KR) .................. 10-2016-0016177

(51) Int. Cl.
*H02J 50/80* (2016.01)
*H02J 50/40* (2016.01)
(Continued)

(52) U.S. Cl.
CPC ............ *H02J 50/40* (2016.02); *H02J 50/10* (2016.02); *H02J 50/80* (2016.02); *H02J 50/90* (2016.02)

(58) Field of Classification Search
CPC ............ H02J 50/10; H02J 50/40; H02J 50/90
(Continued)

(56) References Cited

U.S. PATENT DOCUMENTS

2006/0023667 A1* 2/2006 Tanabe .................. H04B 7/04
370/334
2012/0161539 A1 6/2012 Kim et al.
(Continued)

FOREIGN PATENT DOCUMENTS

EP 2256895 A1 12/2010
JP 2016-25849 A 2/2016
(Continued)

*Primary Examiner* — Daniel J Cavallari
*Assistant Examiner* — Brian K Baxter
(74) *Attorney, Agent, or Firm* — Birch, Stewart, Kolasch & Birch, LLP

(57) ABSTRACT

A wireless power transmitter having a plurality of transmission coils is disclosed. The present transmitter comprises: first to $N^{th}$ coils; and a control unit for transmitting, to a wireless power receiver, a first sensing signal through the first to $N^{th}$ coils, and adjusting transmission orders of the first to $N^{th}$ coils for transmitting a second sensing signal, on the basis of the signal strength of a received first signal strength indicator when the first signal strength indicator corresponding to the first sensing signal is received, wherein the control unit can transmit, to the receiver, the second sensing signal through the first to $N^{th}$ coils on the basis of the adjusted transmission orders. Therefore, device efficiency and user convenience can be improved.

20 Claims, 12 Drawing Sheets

(51) Int. Cl.
*H02J 50/90* (2016.01)
*H02J 50/10* (2016.01)

(58) Field of Classification Search
USPC .......................................................... 307/104
See application file for complete search history.

(56) References Cited

U.S. PATENT DOCUMENTS

| | | |
|---|---|---|
| 2012/0202435 A1 | 8/2012 | Kim et al. |
| 2013/0057205 A1 | 3/2013 | Lee et al. |
| 2013/0082647 A1* | 4/2013 | Yoon ................... H02J 7/00045 320/108 |
| 2016/0025477 A1 | 1/2016 | Madau et al. |
| 2018/0301933 A1* | 10/2018 | Lee ......................... H01F 38/14 |
| 2018/0301936 A1* | 10/2018 | Lee ....................... H04B 5/0037 |
| 2018/0323634 A1* | 11/2018 | Lee ......................... H02J 50/10 |

FOREIGN PATENT DOCUMENTS

| | | |
|---|---|---|
| KR | 10-2012-0090220 A | 8/2012 |
| KR | 10-2013-0026254 A | 3/2013 |
| WO | WO 2015/107528 A1 | 7/2015 |

\* cited by examiner

WIRELESS POWER DEVICE HAVING PLURALITY OF TRANSMISSION COILS AND DRIVING METHOD THEREFOR

CROSS REFERENCE TO RELATED APPLICATIONS

This application is the National Phase of PCT/KR2017/001109 filed on Feb. 2, 2017, which claims priority under 35 U.S.C. § 119(a) to Patent Application No. 10-2016-0016177 filed in the Republic of Korea on Feb. 12, 2016, all of which are hereby expressly incorporated by reference into the present application.

TECHNICAL FIELD

The present invention relates to wireless power transmission technology, and more particularly to a wireless power device including a plurality of transmission coils and a driving method thereof.

BACKGROUND ART

Recently, with the rapid development of information and communication technology, a ubiquitous society is arising based on information and communication technology.

In order for information and communication devices to be connected anytime and anywhere, sensors equipped with a computer chip having a communication function need to be installed in all facilities in society. Therefore, the problem of supplying power to these devices and sensors is a new challenge. In addition, as a variety of portable devices, such as music players, including Bluetooth headsets and iPods, as well as mobile phones, has been rapidly increasing, charging batteries has come to require greater time and effort on the part of users. As a way to solve this problem, a wireless power transmission technology has recently attracted attention.

Wireless power transmission (wireless energy transfer) technology is a technology for wirelessly transmitting electrical energy from a transmitter to a receiver using an electromagnetic induction principle. An electric motor or a transformer that uses such an electromagnetic induction principle was already in use in the 1800s, and thereafter, a method of transferring electrical energy by radiating electromagnetic waves, such as radio waves, a laser, high-frequency waves, and microwaves, has also been attempted. Electric toothbrushes and some wireless shavers that are often used are also actually charged with the electromagnetic induction principle.

Wireless energy transfer schemes devised to date may be broadly classified into an electromagnetic induction scheme, an electromagnetic resonance scheme, and an RF transmission scheme using a short wavelength radio frequency.

The electromagnetic induction scheme is a technology that uses a phenomenon in which a magnetic flux, which is generated when two coils are disposed adjacent to each other and current is applied to one coil, causes the other coil to generate an electromotive force. This technology is being rapidly commercialized around small devices such as mobile phones. The magnetic induction scheme enables the transmission of up to several hundred kilowatts (kW) of power and has high efficiency, but the maximum transmission distance thereof is 1 centimeter (cm) or less, and therefore an object to be charged needs to be disposed adjacent to a charger.

The electromagnetic resonance scheme is characterized in that it uses an electric field or a magnetic field, instead of utilizing electromagnetic waves, currents, or the like. The electromagnetic resonance scheme is advantageously safe to other electronic devices and the human body since it is hardly influenced by electromagnetic waves, which may be problematic. However, the electromagnetic resonance scheme is available only at a limited distance and space, and the energy transfer efficiency thereof is somewhat low.

The short wavelength wireless power transmission scheme, simply put, the RF transmission scheme utilizes the fact that energy may be transmitted and received directly in radio-wave form. This technology is an RF wireless power transmission scheme using a rectenna. The term "rectenna" is a portmanteau of "antenna" and "rectifier", and refers to a device that directly converts RF power into DC power. In other words, the RF scheme is a technology for converting AC radio waves into DC power, and research on commercialization of the RF scheme has been actively conducted as the efficiency thereof has been improved recently.

The wireless power transmission technology may be applied not only to the mobile industry, but also to various other industries such as the IT, railroad, and home appliance industries.

Recently, a wireless power transmitter equipped with a plurality of coils has been introduced in order to increase the recognition rate of a wireless power receiver, which is placed on a charging bed. However, in a conventional wireless power transmitter equipped with a plurality of coils, it is necessary to sequentially transmit sensing signals (e.g., a ping signal used for the electromagnetic induction scheme and a beacon signal used for the electromagnetic resonance scheme) through the respective transmission coils in order to detect the presence of a wireless power receiver.

In particular, such a conventional wireless power transmitter equipped with the plurality of transmission coils has been controlled to sequentially and repeatedly transmit the sensing signals a predetermined number of times (e.g., two times) through the respective transmission coils in order to reduce recognition error for the wireless power receiver and to determine which transmission coil has good charging efficiency.

However, even if the above-described methods are applied, there occurs a problem in that charging is not performed in the case of a specific receiver. Therefore, a more advanced charging method is required.

Technical Object

The present invention has been devised to solve the problems of the related art described above, and it is one object of the present invention to provide a wireless power device having a plurality of transmission coils and a driving method thereof.

It is another object of the present invention to provide a wireless power transmitter having a plurality of transmission coils capable of enhancing the recognition rate of a wireless power receiver and minimizing the time required for recognition, and a driving method thereof.

It is still another object of the present invention to provide a wireless power transmitter having a plurality of transmission coils for further increasing charging efficiency when the function of a wireless power receiver is deteriorated, and a driving method thereof.

It is a further object of the present invention to provide a wireless power transmitter, which enables wireless charging when the alignment of a wireless power receiver is not suitable for the implementation of wireless charging, and a driving method thereof.

The technical objects to be accomplished by the present invention are not limited to the aforementioned technical objects, and other unmentioned technical objects will be clearly understood from the following description by those having ordinary skill in the art.

Technical Solution

According to an embodiment of the present invention, a wireless power transmitter includes a plurality of transmission coils including first to $N^{th}$ coils, and a controller configured to transmit a first sensing signal to a wireless power receiver via the first to $N^{th}$ coils and, upon receiving a first signal strength indicator corresponding to the first sensing signal, adjust a transmission order of the first to $N^{th}$ coils for transmitting a second sensing signal based on a signal strength of the received first signal strength indicator, and the controller transmits the second sensing signal to the receiver via the first to $N^{th}$ coils based on the adjusted transmission order.

It is to be understood that the forging aspects of the present invention are only some exemplary embodiments of the present invention and that various embodiments that incorporate technical features of the present invention will be derived and understood based on the following detailed description of the present invention by those having ordinary skill in the art.

Advantageous Effects

The effects of a method and a device according to the present invention will be described as follows.

According to the present invention, there is an advantage in that a wireless power device having a plurality of transmission coils and a driving method thereof are provided.

In addition, by providing a wireless power transmitter having a plurality of transmission coils capable of increasing the recognition rate of a wireless power receiver and minimizing the time required for recognition, device efficiency and user convenience may be improved.

In addition, by providing a wireless power transmitter having a plurality of transmission coils for further increasing charging efficiency when the function of a wireless power receiver is deteriorated, and a driving method thereof, device efficiency and user convenience may be improved.

In addition, by providing a wireless power transmitter, which enable wireless charging when the alignment of a wireless power receiver is not suitable for wireless charging, and a driving method thereof, device efficiency and user convenience may be improved.

The effects to be accomplished by the present invention are not limited to the aforementioned effects, and other unmentioned effects will be clearly understood from the following description by those having ordinary skill in the art.

DESCRIPTION OF DRAWINGS

The accompanying drawings are included to provide a further understanding of the invention, and illustrate the embodiments of the present invention together with the following detailed description. It is to be understood, however, that the technical features of the present invention are not limited to the specific drawings, and the features disclosed in the respective drawings may be combined with each other to constitute a new embodiment.

BEST MODE

Figure 1:
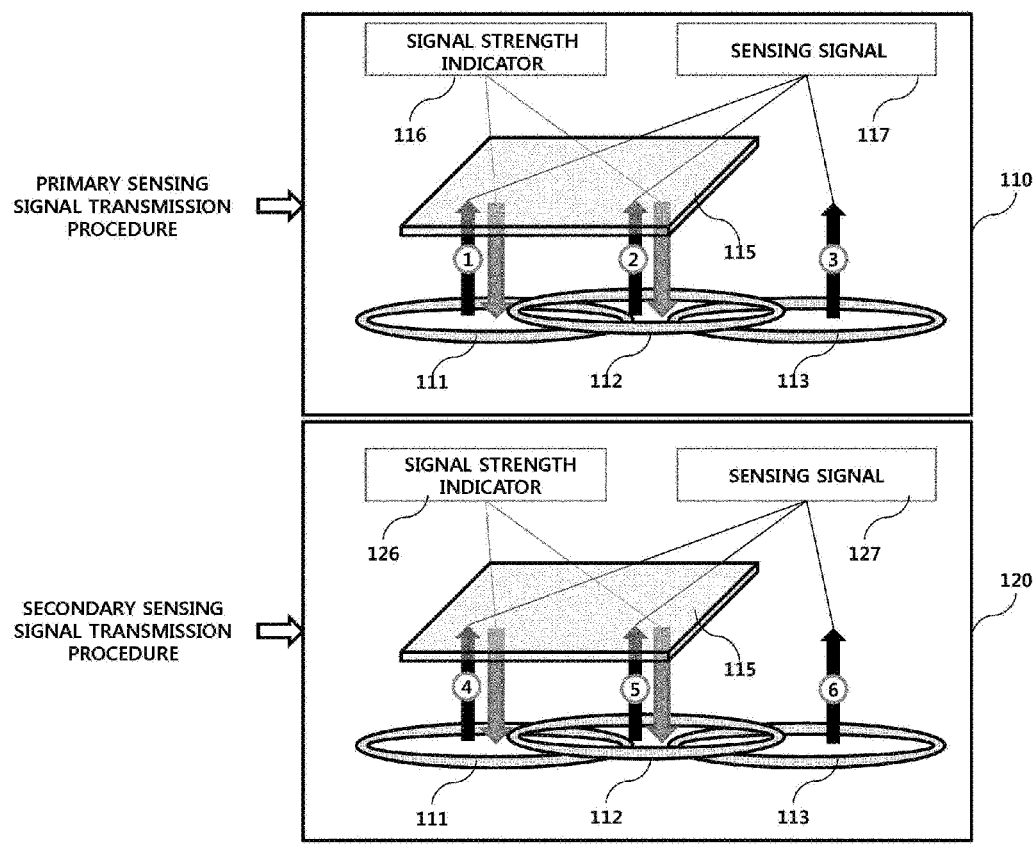
FIG. 1 is a schematic diagram for explaining a sensing signal transmission procedure between a wireless power transmitter having multiple coils and a wireless power receiver according to an embodiment.

According to an embodiment of the present invention, a wireless power transmitter includes a plurality of transmission coils including first to $N^{th}$ coils, and a controller configured to transmit a first sensing signal to a wireless power receiver via the first to $N^{th}$ coils and, upon receiving a first signal strength indicator corresponding to the first sensing signal, adjust a transmission order of the first to $N^{th}$ coils for transmitting a second sensing signal based on a signal strength of the received first signal strength indicator, and the controller is capable of transmitting the second sensing signal to the receiver via the first to $N^{th}$ coils based on the adjusted transmission order.

MODE FOR INVENTION

Hereinafter, a device and various methods, to which the embodiments of the present invention are applied, will be described in more detail with reference to the accompanying drawings. With respect to constituent elements used in the following description, suffixes "module" and "unit" are given or mingled with each other only in consideration of ease in the preparation of the specification, and do not have or serve as different meanings.

It will be understood that, in the following description, when an element is referred to as being formed "on" or "under" another element, it can be directly "on" or "under" the other element or be indirectly formed with intervening elements therebetween. It will also be understood that "on" or "under" the element may be described relative to the drawings.

In the description of the embodiments, "wireless power transmitter," "wireless power transmission device," "transmission terminal," "transmitter," "transmission device," "transmission side," and the like will be interchangeably used to refer to a device that transmits wireless power in a wireless power system, for the convenience of description. In addition, "wireless power reception device," "wireless power receiver," "reception terminal," "reception side," "reception device," "receiver," and the like will be interchangeably used to refer to a device that receives wireless power from a wireless power transmission device, for the convenience of description.

A transmitter according to the present invention may be configured as a pad type, a cradle type, an access point (AP) type, a small base station type, a stand type, a ceiling embedded type, a wall-mounted type, or the like. One transmitter may transmit power to a plurality of wireless power reception devices. To this end, the transmitter may include at least one wireless power transmission unit. Here, the wireless power transmission unit may use various wireless power transmission standards based on an electromagnetic induction scheme for charging power using an electromagnetic induction principle in which a magnetic field is generated in a power transmission terminal coil and electricity is induced in a reception terminal coil by the influence of the magnetic field. Here, the wireless power transmission unit may adopt an electromagnetic induction type wireless charging technique defined in a Wireless Power Consortium (WPC) or a Power Matters Alliance (PMA), which is a wireless charging technology standard organization.

In addition, a receiver according to an embodiment of the present invention may include at least one wireless power reception unit, and may simultaneously receive wireless power from two or more transmitters. Here, the wireless power transmission unit may adopt an electromagnetic induction type wireless charging technique defined in a Wireless Power Consortium (WPC) or a Power Matters Alliance (PMA), which is a wireless charging technology standard organization.

The receiver according to the present invention may be embedded in small electronic devices, such as a mobile phone, a smartphone, a laptop computer, a digital broadcast terminal, a personal digital assistant (PDA), a portable multimedia player (PMP), a navigation system, an MP3 player, an electric toothbrush, an electronic tag, a lighting device, a remote controller, a fishing float, and a wearable device such as a smart watch, without being limited thereto, and may be applied to any devices that may be provided with a wireless power reception unit according to the present invention and may be charged through a battery.

FIG. 1 is a schematic diagram for explaining a sensing signal transmission procedure between a wireless power transmitter having multiple coils and a wireless power receiver according to an embodiment.

The wireless power transmitter may include a plurality of transmission coils. In the following description, it is assumed that the wireless power transmitter includes three transmission coils 111, 112 and 113. Each of the transmission coils 111, 112, and 113 may partially overlap other transmission coils, and the wireless power transmitter may sequentially transmit predetermined sensing signals 117 and 127 (e.g., digital ping signals) to the outside in a predefined order for sensing the presence of the wireless power receiver through the respective transmission coils.

The wireless power transmitter may repeatedly transmit one or more sets of sensing signals. Here, it is assumed that the wireless power transmitter carries out a primary sensing-signal transmission procedure and a secondary sensing-signal transmission procedure, but this is only one embodiment.

The wireless power transmitter may sequentially transmit the sensing signal 117 via the primary sensing-signal transmission procedure, designated by reference numeral 110, and may identify the transmission coils 111 and 112 that have received a signal strength indicator or a signal intensity indicator 116 from the wireless power receiver 115. Subsequently, the wireless power transmitter sequentially transmits the sensing signal 127 via the secondary sensing-signal transmission procedure, designated by reference numeral 120, identifies a transmission coil that has good power transmission efficiency or charging efficiency, among the transmission coils 111 and 112 that have received a signal strength indicator 126, and transmits power through the identified transmission coil.

As illustrated in FIG. 1, the reason why the wireless power transmitter performs the sensing-signal transmission procedure two times is to more accurately identify which transmission coil is well aligned with a reception coil of the wireless power receiver. The number of times the procedure is performed may increase or decrease at the time of implementation.

When a first transmission coil 111 and a second transmission coil 112 receive the signal strength indicators 116 and 126, as designated by reference numerals 110 and 120 in FIG. 1, the wireless power transmitter selects the most well-aligned transmission coil based on the signal strength indicator 126 received by each of the first transmission coil 111 and the second transmission coil 112, and performs wireless charging using the selected transmission coil. The signal strength indicators 116 and 126 may not be transmitted depending on the alignment of the transmission coil and the reception coil.

Figure 2:
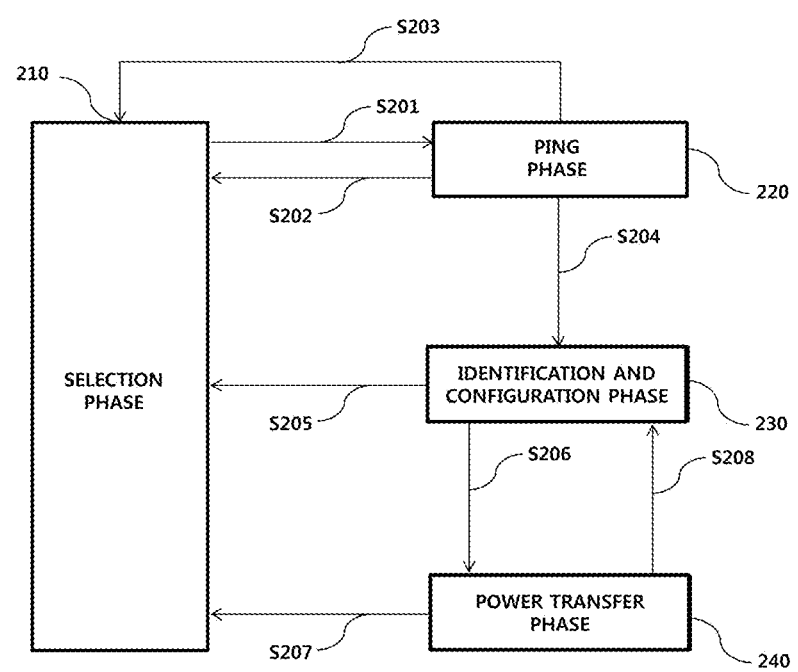
FIG. 2 is a state transition diagram for explaining a wireless power transmission procedure defined in the WPC standard.

FIG. 2 is a state transition diagram for explaining a wireless power transmission procedure defined in the WPC standard.

Referring to FIG. 2, power transmission from a transmitter to a receiver according to the WPC standard may be broadly divided into a Selection phase 210, a Ping phase 220, an Identification and Configuration phase 230, and a Power Transfer phase 240.

The Selection phase 210 may be a phase in which transition is made when a specific error or a specific event is detected while power transmission begins or while power transmission is underway. Here, the specific error and the specific event will be clarified through the following description. In addition, in the Selection phase 210, the transmitter may monitor whether an object is placed on the interface surface. When the transmitter detects that an object is placed on the interface surface, the transmitter may transition to the Ping phase 220 (S201). In the Selection phase 210, the transmitter may transmit an analog ping signal of a very short pulse, and may detect whether or not there is an object in the active area of the interface surface based on a change in the current of the transmission coils.

When the transmitter detects the object in the Ping phase 220, the transmitter activates the receiver, and transmits a digital ping signal to identify whether or not the receiver is a WPC standard compatible receiver. When the transmitter does not receive a response signal (e.g., a signal strength indicator) for the digital ping signal from the receiver in the Ping phase 220, the transmitter may transition back to the Selection phase 210 (S202). In addition, when the transmitter receives, from the receiver, a signal indicating completion of power transmission from the receiver (hereinafter, an End Of Charge signal) in the Ping phase 220, the transmitter may transition to the Selection phase 210 (S203).

Once the Ping phase 220 is completed, the transmitter may transition to the Identification and Configuration phase 230 for identifying the receiver and collecting information regarding the configuration and state of the receiver (S204).

In the Identification and Configuration phase 230, the transmitter may transition to the Selection phase 210 when an unexpected packet is received, when a desired packet is not received for a predefined time (timeout), when there is a packet transmission error, or when no power transfer contract is made (S205).

Once the identification and configuration of the receiver have been completed, the transmitter may transition to the Power Transfer phase 240, in which the transmitter transmits wireless power (S206).

In the Power Transfer phase 240, the transmitter may transition to the Selection phase 210 when an unexpected packet is received, when a desired packet is not received for a predefined time (timeout), when violation of a pre-established power transfer contract occurs, or when charging is completed (S207).

In addition, in the Power Transfer phase 240, when the power transfer contact needs to be reconfigured due to a change in the state of the transmitter or the like, the transmitter may transition to the Identification and Configuration phase 230 (3208).

The above-mentioned power transfer contract may be set based on the state and characteristic information about the transmitter and the receiver. For example, the transmitter state information may include information on the maximum amount of transmittable power and information on the maximum number of acceptable receivers, and the receiver state information may include information on the required power.

Figure 3:
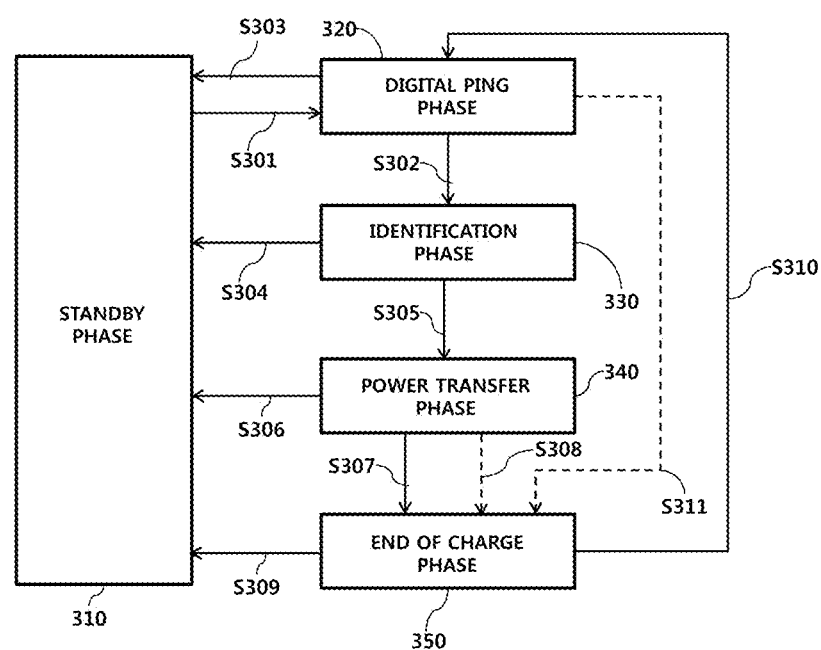
FIG. 3 is a state transition diagram for explaining a wireless power transmission procedure defined in the PMA standard.

FIG. 3 is a state transition diagram for explaining a wireless power transmission procedure defined in the PMA standard.

Referring to FIG. 3, power transmission from a transmitter to a receiver according to the PMA standard may be broadly divided into a Standby phase 310, a Digital Ping phase 320, an Identification phase 330, a Power Transfer phase 340, and an End Of Charge phase 350.

Transition from the Standby phase 310 may be made when a specific error or a specific event is detected while a receiver identification procedure for power transmission is performed or while power transmission is underway. Here, the specific error and the specific event will be clarified through the following description. In addition, in the Standby phase 310, the transmitter may monitor whether an object is placed on a charging surface. When the transmitter detects that an object is placed on the charging surface or when an RXID retry is in progress, the transmitter may transition to the Digital Ping phase 320 (S301). Here, RXID is a unique identifier assigned to a PMA compatible receiver. In the Standby phase 310, the transmitter may transmit an analog ping of a very short pulse, and may detect, based on a change in the current of the transmission coil, whether or not there is an object in the active area of the interface surface (e.g., a charging bed).

After transitioning to the Digital Ping phase 320, the transmitter transmits a digital ping signal to identify whether or not the detected object is a PMA compatible receiver. When sufficient power is supplied to the reception terminal by the digital ping signal transmitted by the transmitter, the receiver may modulate the received digital ping signal according to the PMA communication protocol, and may transmit a predetermined response signal to the transmitter. Here, the response signal may include a signal strength indicator that indicates the strength of power received by the receiver. Upon receiving a valid response signal from the receiver in the Digital Ping phase 320, the transmitter may transition to the Identification phase 330 (S302).

When a response signal is not received by the receiver or when it is determined that the receiver is not a PMA compatible receiver (i.e., Foreign Object Detection (FOD)) in the Digital Ping phase 320, the transmitter may transition to the Standby phase 310 (S303). As an example, a foreign object (FO) may be a metallic object including a coin, a key, or the like.

In the Identification phase 330, the transmitter may transition to the Standby phase 310 when the receiver identification procedure fails or when the receiver identification procedure needs to be re-performed and when the receiver identification procedure is not completed during a predefined time (S304).

When the transmitter succeeds in identifying the receiver, the transmitter may transition from the Identification phase 330 to the Power Transfer phase 340 so as to initiate charging (S305).

In the Power Transfer phase 340, the transmitter may transition to the Standby phase 310 when a desired signal is not received within a predetermined time (timeout), when a foreign object (FO) is detected, or when the voltage of the transmission coil exceeds a predefined reference value (S306).

In addition, in the Power Transfer phase 340, the transmitter may transition to the End Of Charge phase 350 when the temperature detected by a temperature sensor provided in the transmitter exceeds a predetermined reference value (S307).

In the End Of Charge phase 350, when the transmitter determines that the receiver has been removed from the charging surface, the transmitter may transition to the Standby phase 310 (S309).

In addition, when the temperature measured in the over-temperature state after the lapse of a predetermined time falls below a reference value, the transmitter may transition from the End Of Charge phase 350 to the Digital Ping phase 320 (S310).

In the Digital Ping phase 320 or in the Power Transfer phase 340, the transmitter may transition to the End Of Charge phase 350 upon receiving an End Of Charge (EOC) request from the receiver (S308 and S311).

Figure 4:
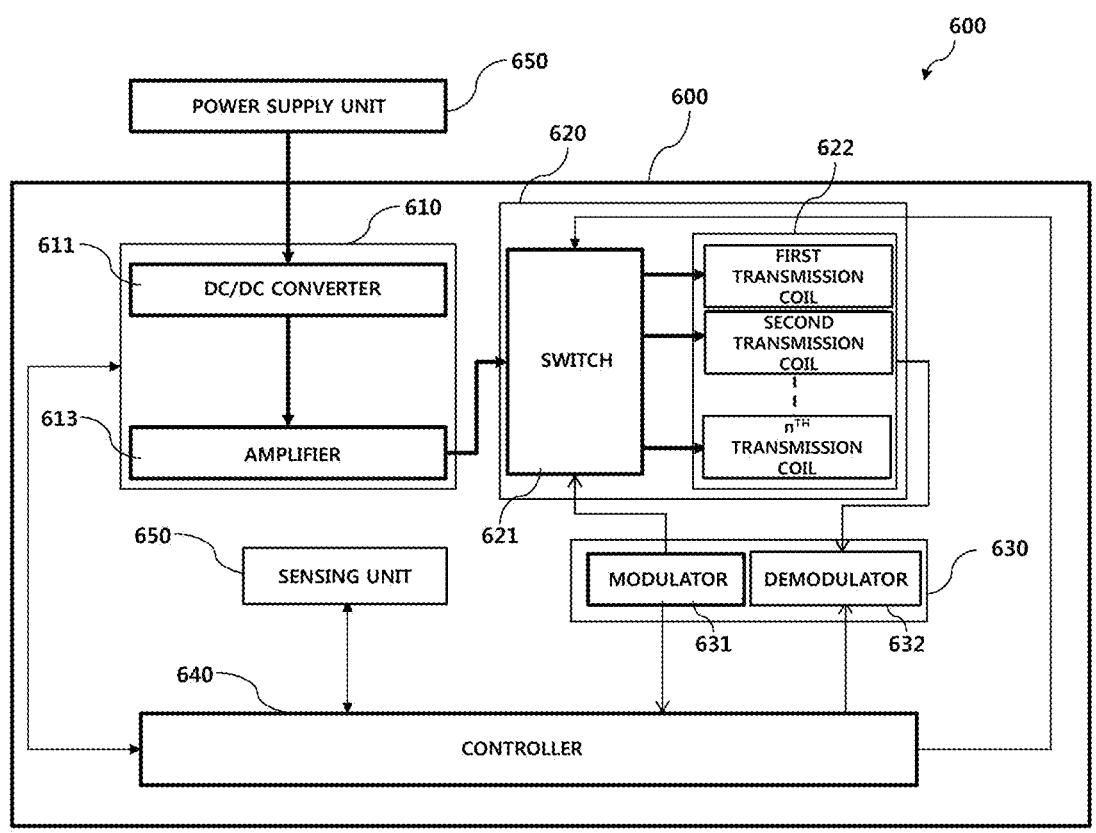
FIG. 4 is a block diagram for explaining the structure of a multi-coil wireless power transmitter according to an embodiment.

FIG. 4 is a block diagram for explaining the structure of a multi-coil wireless power transmitter according to an embodiment.

Referring to FIG. 4, the wireless power transmitter 600 may broadly include a power conversion unit 610, a power transmission unit 620, a modulation and demodulation unit 630, a controller 640, and a sensing unit 650. It is to be noted that the configuration of the wireless power transmitter 600 is not necessarily limited thereto, and may be configured to include a greater or smaller number of components.

When power is supplied from the power supply unit 650, the power conversion unit 610 may convert the power to a predetermined strength of power. To this end, the power conversion unit 610 may include a DC/DC converter 611 and an amplifier 613.

The DC/DC converter 611 may function to convert DC power, supplied from the power supply unit 650, into DC power having a specific strength in response to a control signal of the controller 640.

The controller 640 may adaptively block the supply of power from the power supply unit 650 or block the supply of power to the amplifier 613 based on the voltage/current value measured by a power sensor 612. To this end, a predetermined power cutoff circuit may further be provided at one side of the power conversion unit 610 in order to block the power supplied from the power supply unit 650 or to block the power to be supplied to the amplifier 613.

The amplifier 613 may adjust the strength of DC/DC-converted power in response to a control signal of the controller 640. In one example, the controller 640 may receive a predetermined power control signal, generated by a wireless power receiver, through a demodulator 631, and may adjust the rate of amplification of the amplifier 613 in response to the received power control signal.

The power transmission unit 620 may include a switch 621, a carrier-wave generator 622, and a transmission coil 623.

The carrier-wave generator 622 may function to generate AC power, in which an AC component having a specific frequency is inserted into the output DC power of the amplifier 613 transmitted through the switch 621, and transmit the AC power to a corresponding transmission coil. At this time, the frequencies of the AC power transmitted to respective transmission coils may be different from each other.

The power transmission unit 620 may include the switch 621 for controlling the output power of the amplifier 613 to be transmitted to transmission coils and first to $n^{th}$ transmission coils 622.

The controller 640 may control the switch 621 so that sensing signals may be simultaneously transmitted through the first to $n^{th}$ transmission coils 622 during a primary sensing-signal transmission procedure. At this time, the controller 640 may identify a point in time at which the sensing signal is transmitted via a sensing signal transmission timer (not illustrated). When the sensing signal transmission time point has arrived, the controller 640 may control the switch 621 so as to transmit the sensing signal through a corresponding transmission coil.

In addition, the controller 640 may include a predetermined transmission coil identifier for identifying through which transmission coil a signal strength indicator is received from the demodulator 631 during a primary sensing-signal transmission procedure, and may receive the signal strength indicator through the corresponding transmission coil. Subsequently, during a secondary sensing-signal transmission procedure, the controller 640 may control the switch 621 so that the sensing signal may be transmitted only through the transmission coil(s) that has received the signal strength indicator during the primary sensing-signal transmission procedure. In another example, when a plurality of transmission coils receives the signal strength indicator during the primary sensing-signal transmission procedure, the controller 640 may determine the transmission coil that has received the signal strength indicator having the largest value to be the transmission coil to which the sensing signal is to be transmitted during the secondary sensing-signal transmission procedure, and may control the switch 621 according to the determination result.

The modulation and demodulation unit 630 includes a modulator 631 and a demodulator 632.

The modulator 631 may modulate a control signal generated by the controller 640, and may transmit the modulated control signal to the switch 621. Here, a modulation scheme for modulating the control signal may include a frequency shift keying (FSK) modulation scheme, a Manchester coding modulation scheme, a phase shift keying (PSK) modulation scheme, and a pulse width modulation scheme, for example.

The demodulator 632 may demodulate a sensed signal when sensing a signal received through the transmission coil, and may transmit the demodulated signal to the controller 640. Here, the demodulated signal may include a signal control indicator, an error correction (EC) indicator for power control during wireless power transmission, an End Of Charge (EOC) indicator, an overvoltage/overcurrent/overheat indicator, or the like, without being limited thereto, and may include various pieces of state information for identifying the state of the wireless power receiver.

In addition, the demodulator 631 may identify which transmission coil received the demodulated signal, and may provide the controller 640 with a predetermined transmission coil identifier corresponding to the identified transmission coil.

In addition, the demodulator 631 may demodulate the signal received through the transmission coil 623, and may transmit the demodulated signal to the controller 640. In one example, the demodulated signal may include a signal strength indicator, without being limited thereto, and may include information regarding various states of the wireless power receiver.

In one example, the wireless power transmitter 600 may acquire the signal strength indicator through in-band communication in which communication is performed with the wireless power receiver using the same frequency as that used for wireless power transmission.

In addition, the wireless power transmitter 600 may transmit wireless power using the transmission coil 623, and may exchange various pieces of information with the wireless power receiver through the transmission coil 623. In another example, it is to be noted that the wireless power transmitter 600 may include a separate coil corresponding to each transmission coil 623, and may perform in-band communication with the wireless power receiver using the separate coil provided therein.

The sensing unit 650 may check the overvoltage flowing to the power conversion unit 610, the power transmission unit 620, and the modulation and demodulation unit 630 under the control of the controller 640, and may sense the signal strength indicator received from the wireless power receiver.

Figure 5:
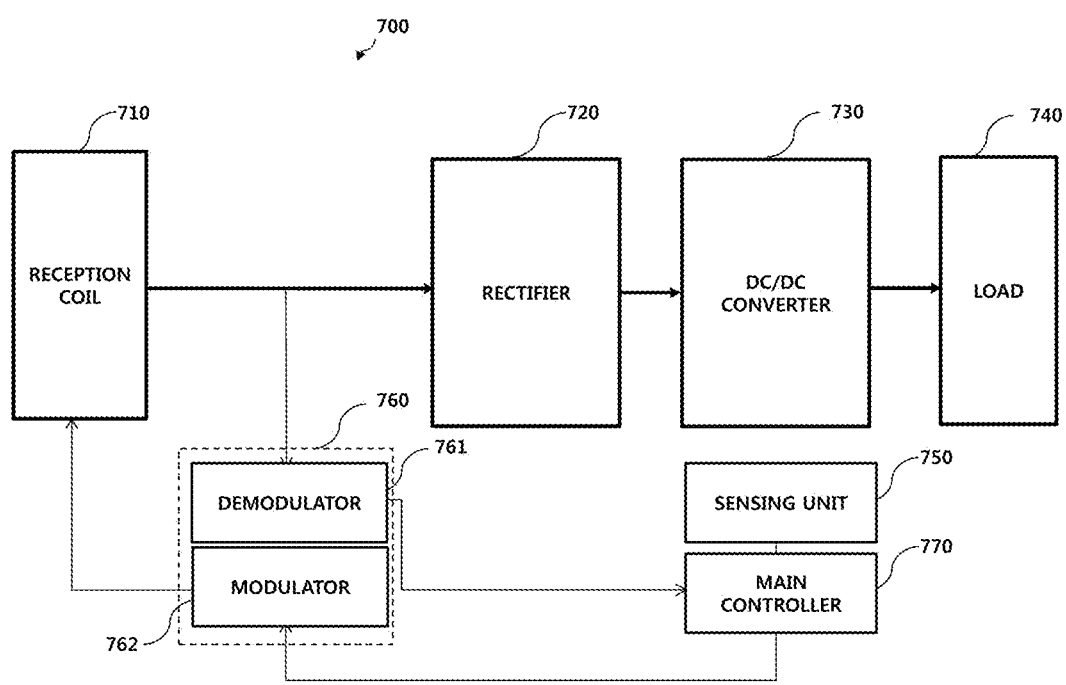
FIG. 5 is a block diagram of a wireless power receiver linked to the multi-coil wireless power transmitter according to the embodiment.

FIG. 5 is a block diagram of the wireless power receiver linked to the multi-coil wireless power transmitter according to the embodiment.

Referring to FIG. 5, the wireless power receiver 700 may include a reception coil 710, a rectifier 720, a DC/DC converter 730, a load 740, a power sensing unit 750, a modulation and demodulation unit 760 including a modulator 761 and a demodulator 762, and a main controller 770.

The AC power received via the reception coil 710 may be transferred to a frequency filter (not illustrated) through a distribution switch (not illustrated). At this time, the frequency filter (not illustrated) may filter a plurality of different carrier frequencies, and may transmit the filtered frequencies to the rectifier 720. The rectifier 720 may convert the filtered AC power into DC power and transmit the DC power to the DC/DC converter 730. The DC/DC converter 730 may convert the strength of DC power output from the rectifier into a strength required by the load 740 and transmit the converted strength of power to the load 740.

The power sensing unit 750 may measure the strength of output DC power included in the rectifier 720 and provide the measured strength of power to the main controller 770. Here, the rectifier 720 may include a plurality of rectifiers.

Specifically, the main controller 770 may determine that the sensing signal is received when the strength of DC power output from the rectifier is equal to or greater than a predetermined reference value. When the sensing signal is received, the main controller 770 may control the modulator 762 so as to transmit a signal strength indicator corresponding to the sensing signal using the carrier frequency used for transmitting the sensing signal.

In another example, the demodulator 761 may demodulate the output of the rectifier 720 to identify whether or not the sensing signal is received, and may transmit information regarding the carrier frequency at which the identified sensing signal is transmitted to the main controller 770. At this time, the main controller 770 may perform control to allow the signal strength indicator to be transmitted through the modulator 762 using the same frequency as the carrier frequency used for the transmission of the identified sensing signal.

Figure 6:
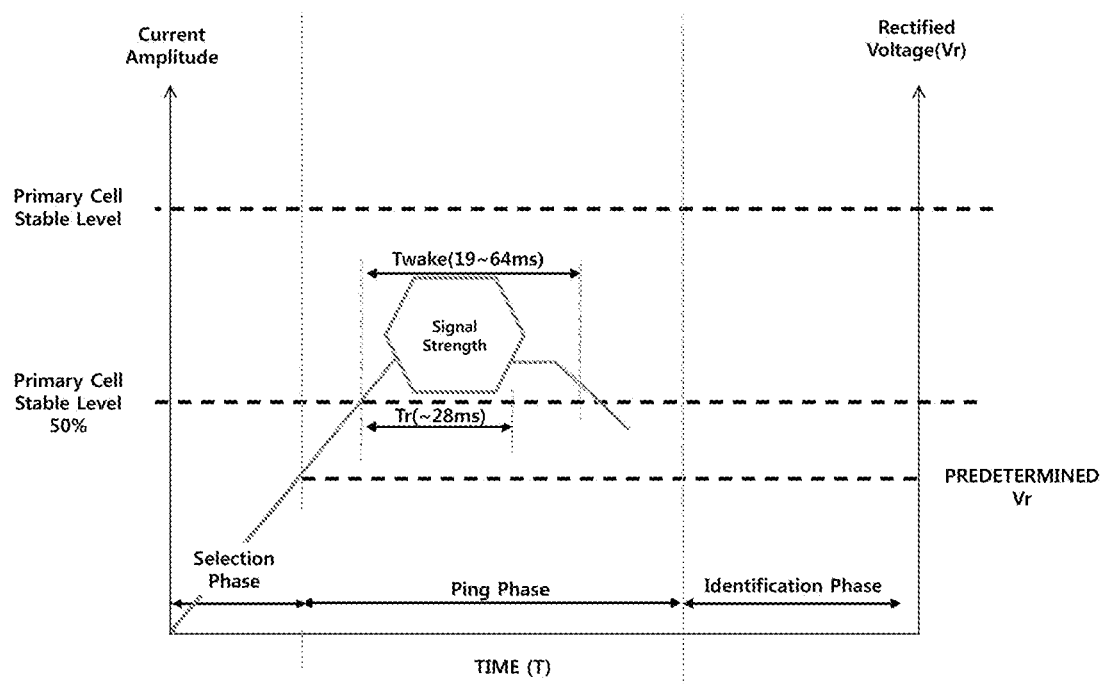
FIG. 6 is a diagram for explaining a wireless power reception procedure defined in the WPC standard.

FIG. 6 is a diagram for explaining a wireless power reception procedure defined in the WPC standard. The reference numerals of FIGS. 2, 4 and 5 will also be used to refer to FIG. 6.

The X-axis is the time T, and the first Y-axis is the current amplitude of a primary cell of the wireless power receiver 700. Here, the primary cell means a cell in which a single transmission coil or multiple coils provide a sufficient magnetic flux through an active area. The second Y-axis corresponds to the rectified voltage Vr sensed by the receiver 700. The wireless power transmitter 600 and the wireless power receiver 700 may transition to the Selection phase 210, the Ping phase 220, and the Identification phase 230.

As described above, when the wireless power transmitter 600 transmits a power signal, the wireless power transmitter may enter the Selection phase 210. In the Selection phase 210, the wireless power receiver 700 may transition to the Ping phase 220 when the rectified voltage Vr becomes sufficiently high (a predetermined voltage Vr). The predetermined voltage Vr may be set differently depending on the device configuration.

In the Ping phase 220, the wireless power receiver 700 may receive a sensing signal from the wireless power transmitter 600. The wireless power receiver 700 may feedback a signal strength indicator to the wireless power transmitter 600. At this time, the receiver 700 may set the standby time Twake of the signal strength indicator. The standby time Twake may be set to about 19-64 ms, but may be set differently according to the device configuration. In addition, when the standby time Twake exceeds 64 ms, wireless charging may fail because transition to the Identification phase 230 is not made.

In addition, the stable level of the primary cell may be set differently according to the device configuration.

The signal strength indicator may be transmitted in the Ping phase 220, and the wireless power transmitter 600 may transition to the Identification phase 230 within a reset time after removing the power signal.

The reset time Tr is the time required for the system to enter the Identification phase. The reset time may be set to the time for the initialization of the receiver, and may be set individually for each coil. The reset time Tr may be 25 ms, but may be set differently according to the device configuration. When the reset time Tr exceeds 28 ms, wireless charging may fail because transition to the Identification phase 230 is not made.

In addition, when the primary cell stable level falls below 50% before the reset time Tr is completed, wireless charging may fail because transition to the Identification phase 230 is not made.

Here, when the wireless power transmitter 600 includes a plurality of coils (when each coil transmits a sensing signal), the wireless power receiver 700 may transmit the signal strength indicator for each of the plurality of coils, and among the coils, the coil that transmits a weak sensing signal may not receive the signal strength indicator.

In addition, the wireless power receiver 700 may have a reset time for each coil, or may have a reset time after transmitting all signal strength indicators.

Figure 7:
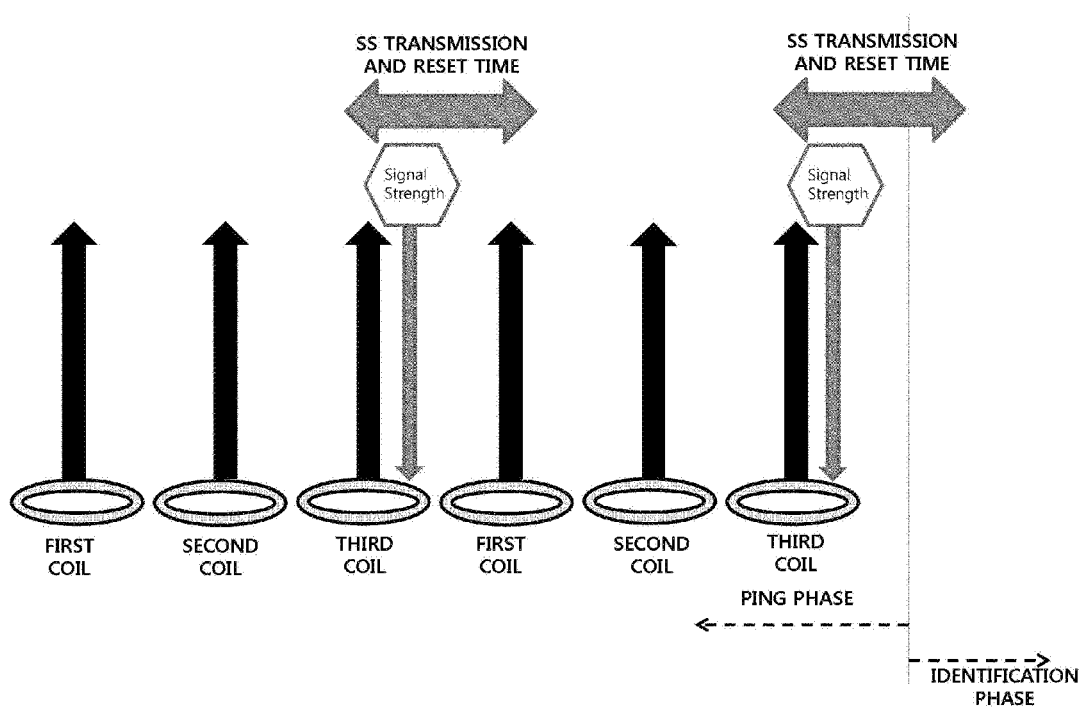
FIG. 7 is a diagram illustrating the case in which no state transition occurs from a Ping phase to an Identification phase according to the related art.

FIG. 7 is a diagram illustrating the case in which no state transition occurs from the Ping phase to the Identification phase according to the related art.

As illustrated in FIG. 7, it is assumed that the wireless power transmitter 600 includes first to third coils.

The wireless power transmitter 600 sequentially transmits sensing signals to the wireless power receiver 700 from the first to third coils.

The wireless power receiver 700 determines that the third coil transmits the most suitable sensing signal (e.g., the sensing signal having a signal strength greater than a predetermined reference), and transmits a signal strength indicator packet to the third coil. The wireless power receiver 700 permits a first reset time after transmitting the signal strength (SS) indicator packet.

Here, the receiver 700 may not transmit an SS packet to any coil that transmits a sensing signal having a weak strength, but this is implementation-dependent.

The wireless power transmitter 600 again transmits sensing signals from the first to third coils after the first reset time. The reason why the sensing signals are repeatedly transmitted is to allow recognition for wireless charging to be more accurately performed. The wireless power receiver 700 again determines that the third coil transmits the most suitable sensing signal, and transmits a signal strength indicator packet to the third coil. The wireless power receiver 700 permits a second reset time after transmitting the SS packet.

Here, when the wireless power transmitter 600 and the wireless power receiver 700 have the second reset time after the SS packet is transmitted, they may not enter the Identification phase after a specific time has passed. Thereby, the wireless power transmitter and the wireless power receiver may not enter the Power Transfer phase, in which case wireless charging fails.

This may occur because the performance and configuration of the wireless power receiver 700 do not comply with standard specifications or due to degradation of constituent elements. For example, when the standby time Twake of the receiver 700 for transmitting the signal strength indicator is set to be long, when the reset time is set to be long, when the current value of the primary cell falls below a predetermined magnitude during the reset time, or when the alignment of the wireless power receiver 700 is incorrect, the above-described problem may occur.

Hereinafter, various embodiments for more effectively solving the above-described problem will be described.

Figure 8:
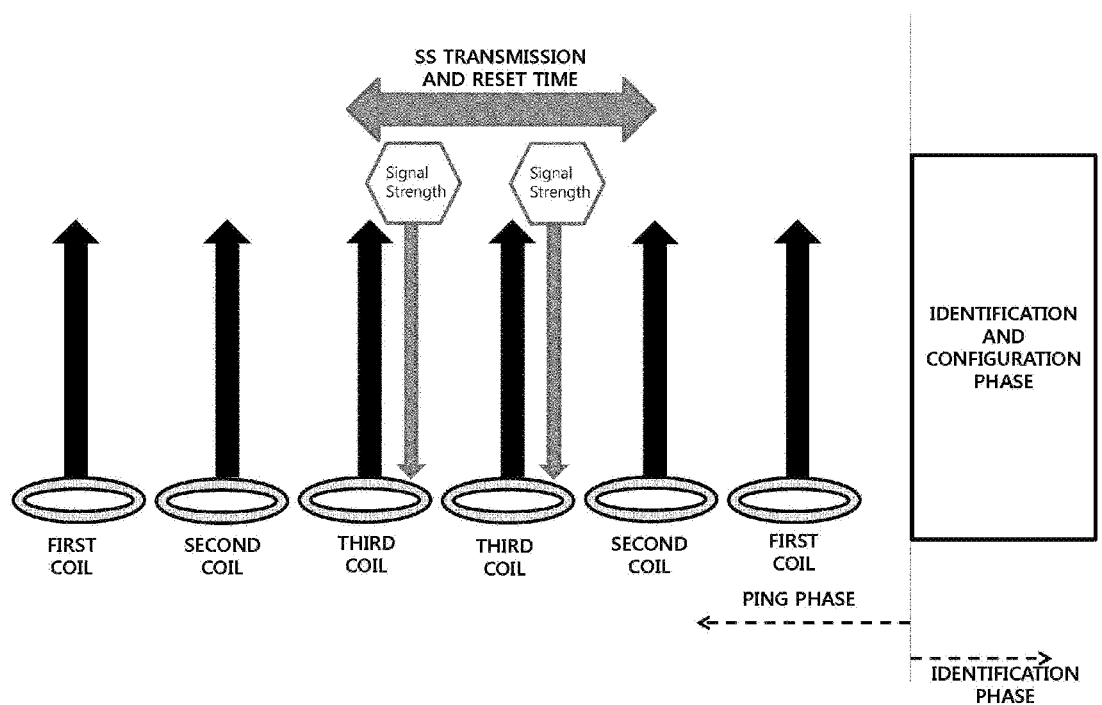
FIGS. 8 and 9 are diagrams illustrating that a wireless power transmission system enters an Identification phase by changing the transmission order of sensing signals of multiple coils according to an embodiment.
Figure 9:
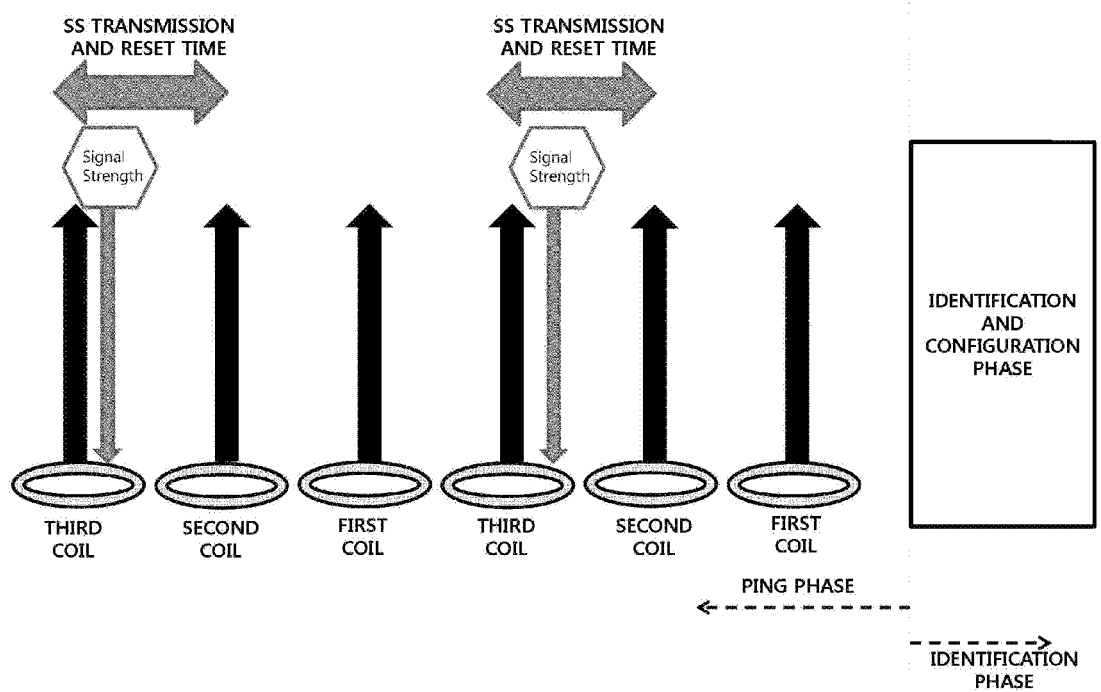

FIGS. 8 and 9 are diagrams illustrating that the wireless power transmission system enters the Identification phase by changing the transmission order of sensing signals of multiple coils according to an embodiment.

As illustrated in FIG. 8, it is assumed that the multiple coils of the wireless power transmitter 600 transmit sensing signals twice (a first cycle and a second cycle).

In the first cycle, the first coil and the second coil of the transmitter 600 do not receive an SS indicator from the receiver 700. The transmitter 600 selects the third coil that has received an SS indicator.

In the subsequent second cycle, the third coil of the transmitter 600 transmits a sensing signal to the receiver 700. Thereby, the wireless power transmission system may enter the Identification phase.

The reason for this is that, when the transmitter 600 transmits the sensing signal through the third coil, there is a margin time, during which the first coil and the second coil transmit sensing signals, even though the standby time Twake and the reset time Treset are long according to the properties of the receiver 700, and therefore, the system may enter the Identification phase.

Alternatively, the transmitter 600 may control the system so as to maintain the current value, which is 50% of that of the primary cell, through the sensing signal of the third coil. Then, the current value of the receiver 700 may fall to a predetermined value (below 50% of that of the primary cell) as time passes. At this time, the transmitter 600 may again transmit the sensing signal to the receiver 700 through the third coil so as to control the current value to exceed 50% of the primary cell during a reset time period.

Meanwhile, the wireless power receiver 700 may transmit information regarding a coil having excellent transmission efficiency to the wireless power transmitter 600 through an in-band channel, instead of the SS indicator. Then, the transmitter 600 may transmit the sensing signal through the coil that forms the primary cell based on the information.

When the transmission of the signal strength indicator and the reset time are sufficient, transition from the Ping phase to the Identification phase may be made without any problem.

In FIG. 9, the transmitter 600 may transmit sensing signals in the order of the third coil, the second coil, and the first coil in the first cycle, and, based on the magnitude of the SS indicator, may again transmit sensing signals in the order of the third coil, the second coil, and the first coil in the second cycle, thereby controlling the system so as to enter the Identification phase, as in FIG. 8.

The receiver 700 may provide the transmitter 600 with information regarding the state of the receiver 700 via in-band communication (or short range communication), in addition to providing the SS indicator.

As illustrated in FIGS. 8 and 9, when the transmission of the signal strength indicator and the reset time are sufficient, transition from the Ping phase to the Identification phase may be made.

Figure 10:
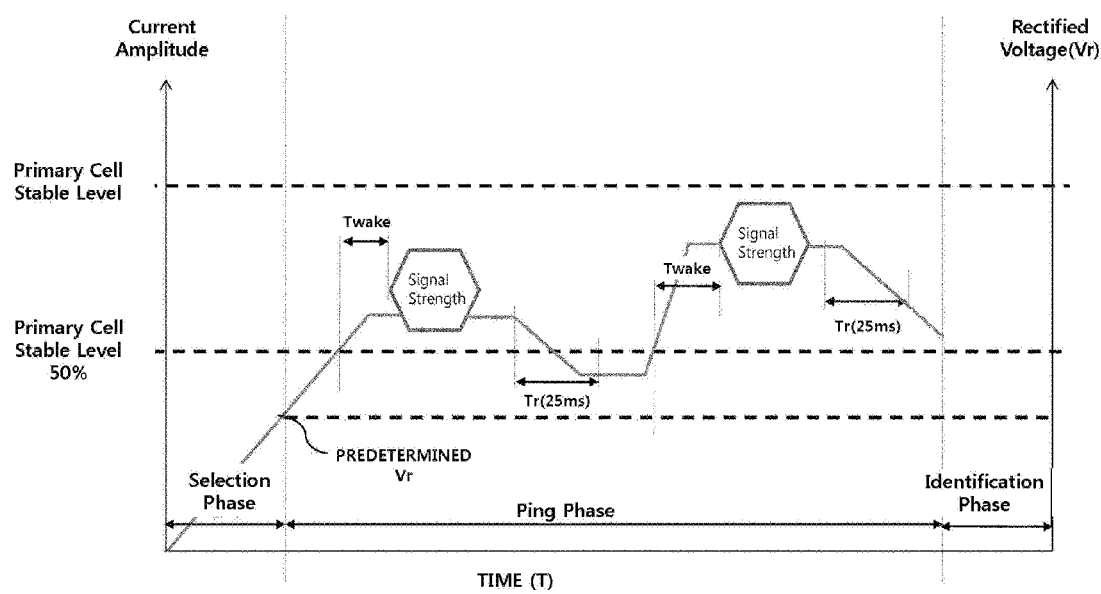
FIG. 10 is a graph illustrating a change in the current value of the wireless power receiver depending on the operation of the wireless power transmitter that transmits the sensing signals.

FIG. 10 is a graph illustrating a change in the current value of the wireless power receiver depending on the operation of the wireless power transmitter that transmits the sensing signals. The case of FIGS. 8 and 9 is assumed. The X-axis, the first Y-axis, and the second Y-axis are the same as those in FIG. 6, and a description thereof will be omitted.

The wireless power receiver 700 transmits an SS indicator to the third coil in the first cycle, and then has a reset time. The current amplitude in the first cycle falls below 50% of the stable level, and the first reset time is not completely satisfied.

At this time, when the wireless power transmitter 600 controls the third coil that has received the SS indicator and transmits a sensing signal to the wireless power receiver 700 in the second cycle, the current value of the wireless power receiver 700 is increased.

Then, the receiver 700 again transmits the SS indicator to the third coil, and the current value is maintained at a preset value (50% of the stable level of the primary cell) even during a reset time period, whereby the system enters the Identification phase.

When the wireless power transmitter 600 does not change the transmission order of the coils when the cycle is changed, the current amplitude may fall below 50% of the stable level during the reset time period, and transition to the Identification phase may not be made.

In addition, when the wireless power receiver 700 assigns excessive standby time Twake for transmitting the SS indicator, the SS indicator may not be transmitted (because transmission of the SS indicator is impossible at the current amplitude below 50% of the stable level), and transition to the Identification phase may not be made. In addition, even when the coil alignment of the receiver 700 is not good, transition to the Identification phase may not be made.

Figure 11:
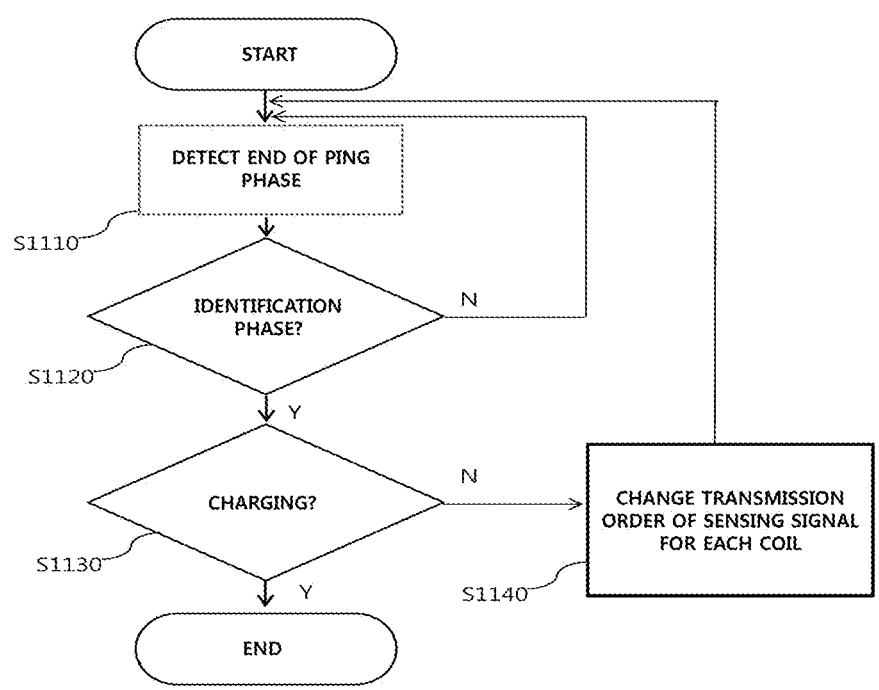
FIG. 11 is a flowchart illustrating a method of driving a wireless power transmission system for changing the transmission order of sensing signals for each coil according to an embodiment.

FIG. 11 is a flowchart illustrating a method of driving a wireless power transmission system for changing the transmission order of sensing signals for each coil according to an embodiment.

First, the system detects that the ping phase ends (S1110).

The system may detect the end of the Ping phase when the receiver 700 transmits an SS indicator and the reset time has passed. In addition, the system may determine the end of the Ping phase even when an identification packet is transmitted.

Then, the system determines whether or not the system has entered the Identification phase (S1120). When the system has entered the Identification phase and is being wirelessly charged (S1130), the system may perform driving for wireless charging.

When the system has not entered the Identification phase, the system again monitors the end of the Ping phase.

In addition, when the system is in the Identification phase but is not charging, the system may change a transmission pattern of sensing signals for each coil (S1140), and may then again enter the Ping phase.

Figure 12:
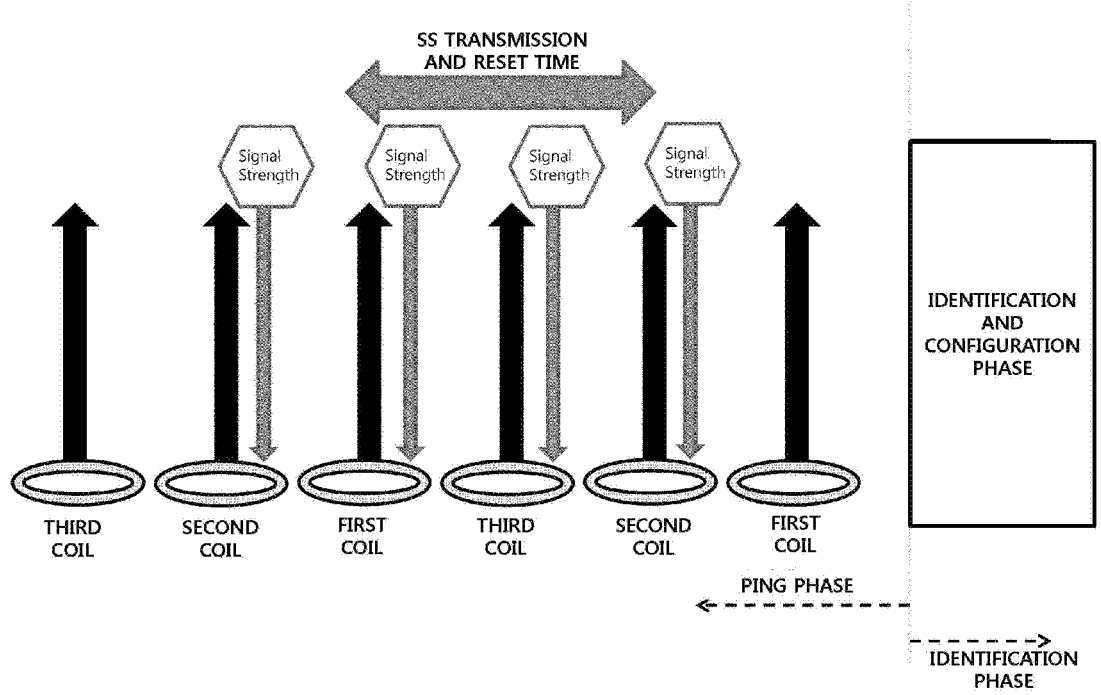
FIG. 12 is a diagram for explaining a method of driving a wireless power system when a signal strength indicator is received through multiple coils according to an embodiment.

FIG. 12 is a diagram for explaining a method of driving the wireless power system when a signal strength indicator is received through multiple coils according to an embodiment.

According to FIG. 12, the second coil and the third coil of the transmitter 600 receive an SS indicator from the receiver 700 in the first cycle.

The transmitter 600 may determine the strength of the SS indicator received by the second coil and the third coil, and may change the transmission order of the second coil and the third coil in the second cycle. In this case, as described above, the system enters the Identification phase.

In addition, the transmitter 600 may simultaneously transmit sensing signals through a plurality of coils (the second coil and the third coil), and at the same time, may transmit wireless power through the coil of the receiver 700.

In particular, the receiver 700 may transmit current value information to the transmitter 600 while transmitting the SS indicator to the transmitter 600. Then, the transmitter 600 may transmit a sensing signal based on the information. In addition, when the current value falls by a predetermined amount in the middle of the reset time period, the receiver 700 may transmit information regarding the change in current value to the transmitter 600. Thereby, the transmitter 600 may transmit a sensing signal in response thereto.

The method according to the above-described embodiment may be implemented as a program to be executed on a computer and stored in a computer-readable recording medium. Examples of the computer-readable recording medium include ROM, RAM, CD-ROM, magnetic tapes, floppy disks, and optical data storage devices, and also include carrier-wave type implementation (e.g., transmission over the Internet).

The computer-readable recording medium may be distributed to a computer system connected over a network, and computer-readable code may be stored and executed thereon in a distributed manner. Functional programs, code, and code segments for implementing the method described above may be easily inferred by programmers in the art to which the embodiments pertain.

It is apparent to those skilled in the art that the present invention may be embodied in specific forms other than those set forth herein without departing from the spirit and essential characteristics of the present invention.

Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

The present invention is applicable to a wireless power transmission device having a plurality of transmission coils.

The invention claimed is:

1. A wireless power transmitter comprising:
   first to $N^{th}$ coils configured to wirelessly transmit an alternating current power signal, wherein N is a positive integer; and
   a controller configured to:
      transmit first sensing signals to a wireless power receiver via the first to $N^{th}$ coils and,
      upon receiving a response signal including a signal strength indicator corresponding to at least one of the first sensing signals, adjust a transmission order for second sensing signals to be transmitted via coils among the first to $N^{th}$ coils based on a strength of the response signal.

2. The wireless power transmitter according to claim 1, wherein the controller adjusts the transmission order for the second sensing signals when a wake time for triggering transmission of the response signal is set to be longer than a predetermined time.

3. The wireless power transmitter according to claim 1, wherein the controller adjusts the transmission order for the second sensing signals when a reset time for resetting the wireless power receiver is set to be longer than a predetermined time.

4. The wireless power transmitter according to claim 1, wherein the controller adjusts the transmission order for the second sensing signals to prevent a current value of the wireless power receiver from falling below a predetermined reference value during a reset time for resetting the wireless power receiver.

5. The wireless power transmitter according to claim 1, wherein the controller controls the second sensing signals to be transmitted via at least one of the first to $N^{th}$ coils that has received the response signal.

6. The wireless power transmitter according to claim 5, wherein the controller controls the second sensing signals to be transmitted in descending order of strength of the response signal when the response signal is received in a plural number via the first to $N^{th}$ coils.

7. The wireless power transmitter according to claim 1, wherein the controller controls the first sensing signals to be simultaneously transmitted via the first to $N^{th}$ coils for a predetermined period.

8. The wireless power transmitter according to claim 1, wherein the controller controls the first sensing signals to be transmitted in a predefined order of the first to $N^{th}$ coils.

9. The wireless power transmitter according to claim 1, wherein the first sensing signals and the second sensing signals are digital ping signals defined in a WPC standard or a PMA standard.

10. The wireless power transmitter according to claim 1, wherein the first sensing signals and the second sensing signals have a difference in at least one of an output voltage strength, a transmission period, or a transmission time.

11. A method of driving a wireless power transmitter, the method comprising:
   transmitting first sensing signals via first to $N^{th}$ coils provided in the wireless power transmitter, wherein N is a positive integer;
   receiving a response signal including a first signal strength indicator corresponding to at least one of the first sensing signals;
   adjusting a transmission order for transmitting second sensing signals via the first to $N^{th}$ coils based on a strength of the response signal to generate an adjusted transmission order; and
   transmitting the second sensing signals via coils among the first to $N^{th}$ coils according to the adjusted transmission order.

12. The method according to claim 11, wherein the transmission order for the second sensing signals is adjusted when a wake time for triggering transmission of the response signal is set to be longer than a predetermined time.

13. The method according to claim 11, wherein the transmission order for the second sensing signals is adjusted when a reset time for resetting the wireless power receiver is set to be longer than a predetermined time.

14. The method according to claim 11, wherein the transmission order for the second sensing signals is adjusted to prevent a current value of the wireless power receiver from falling below a predetermined reference value during a reset time for resetting the wireless power receiver.

15. The method according to claim 11, wherein the second sensing signals are transmitted via at least one of the first to $N^{th}$ coils that has received the response signal.

16. The method according to claim 15, wherein the second sensing signals are controlled to be transmitted in descending order of strength of the response signal when the response signal is received in a plural number via the first to $N^{th}$ coils.

17. The method according to claim 11, wherein the first sensing signals are simultaneously transmitted via the first to $N^{th}$ coils for a predetermined period.

18. The method according to claim 11, wherein the first sensing signals are transmitted in a predefined order of the first to $N^{th}$ coils.

19. The method according to claim 11, wherein the first sensing signals and the second sensing signals are digital ping signals defined in a WPC standard or a PMA standard.

20. The method according to claim 11, wherein the first sensing signals and the second sensing signals have a difference in at least one of an output voltage strength, a transmission period, or a transmission time.

* * * * *